(Model.)

C. DE QUILLFELDT.
BOTTLE STOPPER.

No. 260,851. Patented July 11, 1882.

WITNESSES:
Jos. N. Rosenbaum
Otto Risch

INVENTOR
Charles de Quillfeldt
BY Paul Goepel
ATTORNEY.

UNITED STATES PATENT OFFICE.

CHARLES DE QUILLFELDT, OF NEW YORK, N. Y., ASSIGNOR TO HENRY W. PUTNAM, OF SAME PLACE.

BOTTLE-STOPPER.

SPECIFICATION forming part of Letters Patent No. 260,851, dated July 11, 1882.

Application filed June 8, 1882. (Model.)

*To all whom it may concern:*

Be it known that I, CHARLES DE QUILLFELDT, of the city, county, and State of New York, have invented certain new and useful Improvements in Bottle-Stoppers, of which the following is a specification.

This invention has reference to improvements in bottle-stoppers of that class in which the locking-lever is fulcrumed to central lugs of the stopper-head and connected to a bail or yoke pivoted to the neck-band of the bottle, in such a manner that the stopper is forced securely into the mouth of the bottle by the action of the lever and quickly withdrawn from the same on swinging the lever around its fulcrum to the opposite side of the bottle.

The invention consists of a stopper having a top plate or head with raised lugs, to which the locking-lever is fulcrumed, said lever having a segmental slot and a notch or recess at that end of the slot nearest to the fulcrum, for engaging a bail or yoke that is pivoted at its lower ends to the neck-band of the bottle and passed transversely through the slot of the locking-lever.

Figure 1:
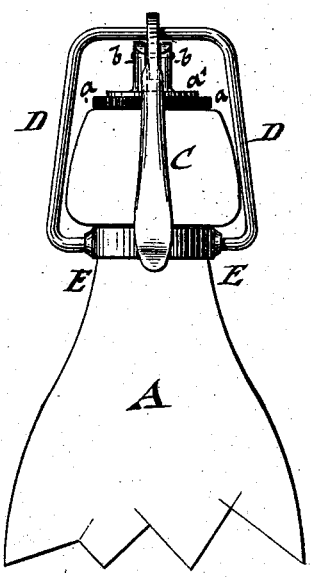
Figure 2:
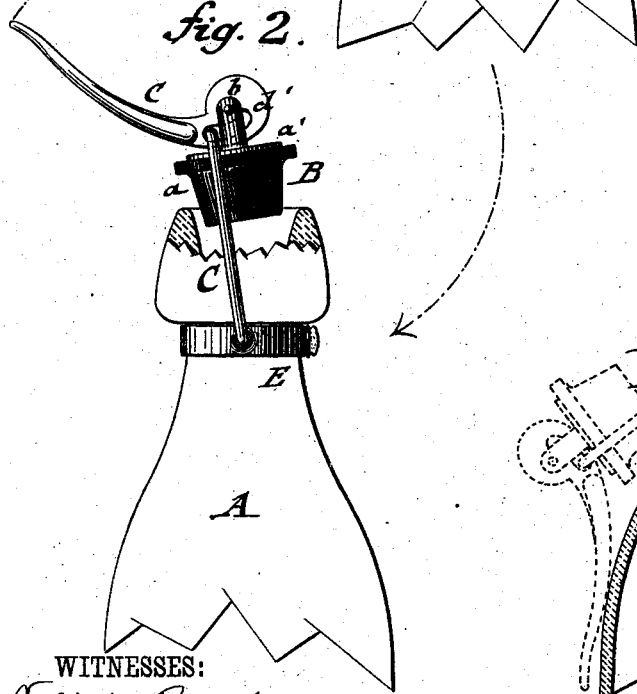

In the accompanying drawings, Figure 1 represents an end elevation of my improved bottle-stopper as applied to a bottle. Fig. 2 is a side view of the same, shown in the act of being opened; and Fig. 3 is a vertical transverse section of the stopper, shown closed in the bottle, the open position being indicated in dotted lines alongside of the bottle.

Similar letters of reference indicate the corresponding parts.

A in the drawings represents a bottle the mouth of which is closed by a stopper, B, which is composed in the usual manner of a flanged body, *a*, of rubber, and of a top plate or head, *a'*, provided with upright center lugs, *b*.

Figure 3:
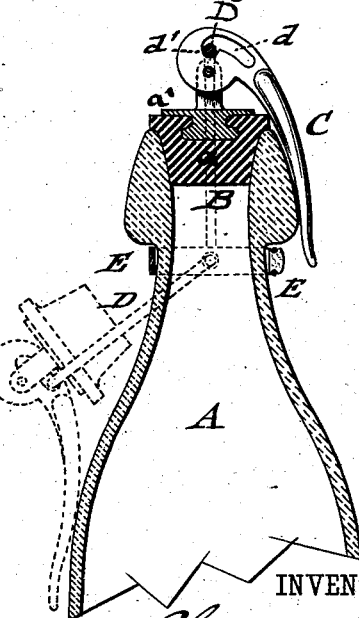

To the lugs *b* of the stopper B is fulcrumed a lever, C, the handle of which is curved so as to fit snugly to the side of the bottle-head when the stopper is inserted into the bottle, as shown clearly in Fig. 3.

The lever C is provided with a segmental slot, *d*, exterior to the fulcrum that forms the connection between the lever C and the lugs *b*, said slot being provided at the end nearest to the pivot with a notch or recess, *d'*. The opposite end of the segmental slot *d* is at a greater distance from the pivot of the lever C, as appears clearly from the drawings.

A bail or yoke, D, of inverted-U shape is pivoted at its lower ends to the neck-band E of the bottle and passed at its upper part transversely through the slot of the locking-lever C.

The bottle-stopper is operated as follows: When it is desired to close the same the stopper B is placed into position above the mouth of the bottle, in which position the lever C extends in upward direction, while the bail assumes an inclination toward one side, as shown in Fig. 2. In this position of lever, stopper, and bail the latter is at the end of the slot farthest from the fulcrum. By carrying then the lever over the head of the bottle toward the other side of the same, as shown by dotted lines and arrows in Fig. 2, the bail rides along on the under edge of the slot—which, in the inverted position of the lever, as in Fig. 3, is the upper edge of the slot—until it arrives in the recess at the end of the slot nearest the fulcrum, by which end it is taken hold of and swung over the fulcrum of the lever. By thus swinging the lever around its fulcrum from one side of the bottle-neck to the other the bail is carried along and swung on its pivots at the neck-band through the arc of a circle. As the notch of the slotted lever takes hold of the bail and carries it gradually into vertical position the stopper and lever are lowered relatively to the bail and the stopper forced into the bottle-mouth. The slot of the lever facilitates the easier closing or opening of the stopper, as the stopper can be raised to a greater distance from the bottle-mouth than the stopper would be raised if there were merely a small opening for the bail to pass through. As the notch is arranged at that end of the slot nearest to the fulcrum and in close proximity to the same, the bail is also moved closely to the lugs on and after being taken up by the notch, said lugs being rounded off at the upper end for this purpose, so as to enable the bail to pass readily and easily into locked position and from the same into open position. The motion of the lever carries the swinging bail slightly beyond the vertical center-line of the fulcrum and locks thereby the lever alongside of the bottle-head. In opening, the swinging motion of the lever carries the bail first to the farthest end of the segmental slot and into a sidewise inclined position, raises then the stopper out of the mouth of the bottle, and brings finally the entire mechanism into a position alongside of the bottle, as shown in dotted lines in Fig. 3.

Having thus described my invention, I claim as new and desire to secure by Letters Patent—

The combination of a stopper having upright center lugs rounded off at their upper ends, of an operating and locking lever fulcrumed to the lugs and provided with an eccentric slot having a notch or recess at the end nearest to the fulcrum, and of a bail or yoke that is pivoted to the neck-band of the bottle and passed transversely through the slot of the locking-lever, substantially as and for the purpose set forth.

In testimony that I claim the foregoing as my invention I have signed my name in presence of two subscribing witnesses.

CHARLES DE QUILLFELDT.

Witnesses:
PAUL GOEPEL,
SIDNEY MANN.